United States Patent
Hiratsuka et al.

(10) Patent No.: US 6,746,798 B1
(45) Date of Patent: Jun. 8, 2004

(54) RECTANGULAR AND SEALED BATTERY

(75) Inventors: Masaru Hiratsuka, Fukushima (JP); Yoshinori Hashimoto, Fukushima (JP); Takayuki Yamahira, Fukushima (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/341,209

(22) PCT Filed: Nov. 6, 1998

(86) PCT No.: PCT/JP98/05016
§ 371 (c)(1),
(2), (4) Date: Aug. 23, 1999

(87) PCT Pub. No.: WO99/25036
PCT Pub. Date: May 20, 1999

(30) Foreign Application Priority Data

Nov. 7, 1997 (JP) ............................................. P9-305960
Feb. 26, 1998 (JP) ......................................... P10-045514

(51) Int. Cl.[7] .............................. H01M 2/02; H01M 2/04
(52) U.S. Cl. ........................ 429/163; 429/175; 429/176; 429/185
(58) Field of Search ................................. 429/163, 175, 429/176, 185

(56) References Cited

U.S. PATENT DOCUMENTS

| | | | | |
|---|---|---|---|---|
| 4,724,190 A | * | 2/1988 | Siga et al. ................... | 429/158 |
| 5,549,717 A | * | 8/1996 | Takeuchi et al. ............ | 29/623.2 |
| 5,601,950 A | * | 2/1997 | Yamahira et al. ......... | 429/231.8 |
| 5,663,007 A | * | 9/1997 | Ikoma et al. .................. | 429/53 |
| 5,746,780 A | * | 5/1998 | Narukawa et al. .......... | 29/623.1 |
| 6,010,803 A | * | 1/2000 | Heller, Jr. et al. ........... | 429/175 |

FOREIGN PATENT DOCUMENTS

| | | | |
|---|---|---|---|
| JP | 57-145265 | | 9/1982 |
| JP | 61-285655 | | 12/1986 |
| JP | 63-41863 | | 3/1988 |
| JP | 8-185835 | * | 7/1996 |
| JP | 8-292292 | * | 11/1996 |

* cited by examiner

Primary Examiner—Bruce F. Bell
Assistant Examiner—Jonathan Crepeau
(74) Attorney, Agent, or Firm—Sonnenschein, Nath & Rosenthal LLP (57) ABSTRACT

A rectangular and sealed battery incorporating an outer can for accommodating a power generation element and a cover for closing an opening of the outer can such that the outer can and the cover are welded to each other. The thickness of a body portion of the outer can is smaller than the thickness of the opening. A flange formed into a stepped portion is provided for the outer end of the cover, and the end of the opening of the outer can is made contact with the outer surface of a projection of the cover formed by the stepped portion so as to be joined to the outer surface of the projection and butt-welded to the flange. In the foregoing case, the cover and the end of the opening of the outer can are welded to each other from a side direction.

12 Claims, 4 Drawing Sheets

RECTANGULAR AND SEALED BATTERY

BACKGROUND OF THE INVENTION

The present invention relates to a rectangular and sealed battery, and more particularly to a structure for sealing an outer can and a cover.

In recent years, there has been a significant improvement in performance and reduction in size of electronic apparatuses, represented by video cameras and headphone stereo units. Therefore, improvement in heavy load characteristics and high energy densities of secondary batteries, serving as power sources of the electronic apparatuses, have been required.

As the secondary battery for use in the foregoing electronic apparatuses, lead secondary batteries and nickel-cadmium secondary batteries have been known. Recently lithium-ion secondary batteries having higher performance characteristics have been used. As for the shape of the secondary battery, a rectangular shape has widely been used as compared with a cylindrical shape because the space can effectively be used after the rectangular secondary battery has been mounted on the apparatus.

Figure 1:
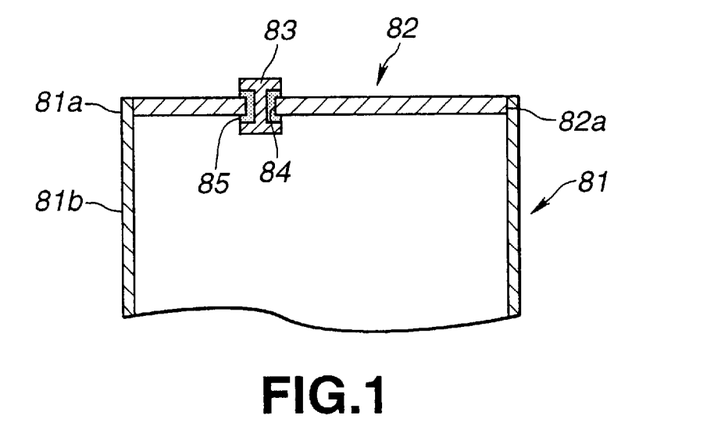
FIG. 1 is a s schematic cross sectional view showing a conventional rectangular and sealed battery.

A conventional rectangular battery of the foregoing type, as shown in FIG. 1 has a structure that a power generation element (a laminate of a positive electrode and a negative electrode formed through a separator) is accommodated in an outer can 81. Moreover, an opening of the outer can 81 is closed by a flat cover 82 so that a sealed structure is formed.

The outer can 81 is a steel can having substantially the same thickness throughout the overall body from an opening 81a to a body 81b. Usually the outer can 81 is plated with Cu/Ni having a thickness of several $\mu$m.

The cover 82 is manufactured by stamping a steel plate, and by performing machining, such as drawing or casting, to have a size substantially the same as or slightly smaller than that of the opening of the outer can 81. Also a terminal hole 84, through which a counter terminal 83 is inserted, is formed in the cover 82. The terminal 83 is, through a gasket 85, inserted into a terminal hole 84 of the cover 82, and then the leading end of the terminal 83 is crimped. Thus, the terminal 83 is integrally secured to the cover 82. As a result, either of electrodes of the battery is formed. When the foregoing electrode is electrically connected to a positive electrode of the power generation elements accommodated in the outer can 81, the foregoing electrode serves as a positive-electrode terminal. The structure for joining the terminal 83 is not limited to the above-mentioned structure. Another structure may be employed if the structure is able to maintain electrical insulation with respect to the cover 82 and hermeticity of the inside portion of the battery.

An outer end 82a of the cover 82 is joined to the inner surface of the outer can 81, and then laser welding or seam welding is performed from an upper position. Thus, the cover 82 is sealed.

Weight reduction of a rectangular and sealed battery of the foregoing type has been required. In a case of a rectangular and sealed battery having a size 6 mm (t)×30 mm (w)×48 mm (h) and overall weight of about 25 g (including about 11 g which is the weight of the can), reduction in the overall thickness (0.4 mm) of the outer can (to, for example, 0.2 mm) enables the overall weight to be reduced to about 20 g.

When an amount of melting of the outer can 81 occurring during a seam welding operation is considered to maintain the reliability of the seam welding operation, the thickness of the outer can 81 cannot be reduced to be smaller than 0.3 mm. Therefore, there arises a problem in that the weight cannot satisfactorily be reduced.

Therefore, an attempt has been made to change the material of the outer can 81 and the cover 82 from steel to an aluminum material having a low specific gravity. Since the outer can 81 and the cover 82 must have required strength, the thickness of the outer can must be 0.5 mm or greater. Therefore, another problem arises in that the capacity of the battery is reduced.

Since the cover 82 of the rectangular and sealed battery structured shown in FIG. 1 is formed into a plate-like shape, satisfactory flexural stiffness cannot be realized. Thus, there arises a problem in that deformation easily occurs even in usual handling. If the cover 82, which has been deformed, is joined to the outer can 81, a stepped portion is formed in the seam welded portion. Thus a defect (a pin hole or a crack) is easily caused in welding. Moreover, position control of an end 81a of the opening of the outer can 81 is not performed in the vertical direction (in a direction into which the cover 82 is inserted). The foregoing fact causes a stepped portion to be formed in the seam-welded portion and a defect (a pin hole or a crack) to occur in the welded portion. If a pinhole is formed in the welded portion, leakage of electrolyte and introduction of water into the inside portion of the battery occur. In this case, the commercial value of the sealed battery deteriorates excessively. If a crack occurs, the strength of the welded portion excessively decreases. If the internal pressure is raised in a case of overcharge or during preservation at high temperatures, the crack spreads out from the welded portion. In the foregoing case, there is apprehension that the contents of the battery leak and apparatus is contaminated.

To prevent the defect occurring in welding, the gap between the cover 82 and the outer can 81 which are joined to each other is required to be minimized. In this case, an accuracy of the dimensions of the shape of the cover 82 and an accuracy of the dimensions of the inner surface of the outer can 81 must be improved. Thus, there arises a problem in that the costs of the elements cannot be reduced. If the gap between the joined elements is narrowed, that is, reduced, the cover 82 cannot easily be inserted into the outer can 81. In this case, there arises a problem in that the productivity in an automatic assembling process deteriorates.

DISCLOSURE OF THE INVENTION

To solve the above-mentioned problems, a first object of the present invention is to reduce the weight of a rectangular and sealed battery such that the reliability of seam welding is maintained and reduction in the capacity of the battery is prevented.

Moreover, a second object of the present invention is to prevent defects occurring in a welding process such that deterioration in the productivity in a process for assembling the rectangular and sealed battery is prevented.

The inventor of the present invention has found that the first object can be achieved by reducing the thickness of the body of the outer can of a rectangular and sealed battery and by providing a flange or a tapered portion for an end or rim portion of the opening of the outer can. Moreover, the second object can be achieved by providing a stepped portion for the outer end of the cover to form a flange. Thus, the present invention has been achieved.

That is, a rectangular and sealed battery which is capable of achieving the first object comprises: an outer can for accommodating a power generation element; and a cover for closing an opening of the outer can such that the outer can and the cover are welded to each other, wherein the thickness of a body portion of the outer can is smaller than the thickness of the rim portion of the opening.

A rectangular and sealed battery which is capable of achieving the second object has a structure according to that of the foregoing rectangular and sealed battery, wherein a flange in the form of a stepped portion is formed around the outer end of the cover, an end of the opening of the outer can is brought into contact with the outer surface of a projection of the cover formed by the stepped portion so as to be joined to the outer surface, and the end of the opening is butt-welded to the flange.

The first rectangular and sealed battery noted above according to the present invention has the structure that the thickness of the body of the outer can is reduced while the thickness of the end of the opening or rim portion of the outer can, which is seam-welded to the cover, has the same thickness as that of the conventional battery. Therefore, the weight of the rectangular and sealed battery can be reduced while the reliability of the seam-welded portion is maintained. The inner diameter of the body of the outer can is enlarged while the outer diameter is not changed. Therefore, the capacity required for the battery can be enlarged, causing an active material for the electrode to be enclosed in a quantity larger than that permitted for the conventional battery. As a result, the capacity of the battery can be enlarged.

The second rectangular and sealed battery according to the present invention has the structure that the flange having the stepped shape is formed around the outer end of the cover, and the end of the opening of the outer can is joined to the projection of the cover formed by the stepped portion. Since the end of the opening of the outer can is abutted against the flange, the position of the outer can is limited. Moreover, the outer can is brought into contact with the outer surface of the projection. Therefore, the second aspect of the rectangular and sealed battery according to the present invention enables the outer can and the cover to stably and easily be joined to each other. Therefore, a reliable seam welding operation can be performed such that formation of a pinhole and a small crack can furthermore be prevented.

These and other features and aspects of the invention will become clear in the following detailed description of a few typical exemplary embodiments with reference to the accompanying drawings.

DETAILED DESCRIPTION OF THE PRESENTLY PREFERRED EMBODIMENTS

A rectangular and sealed battery according to the present invention will now be described with reference to the drawings.

Figure 2:
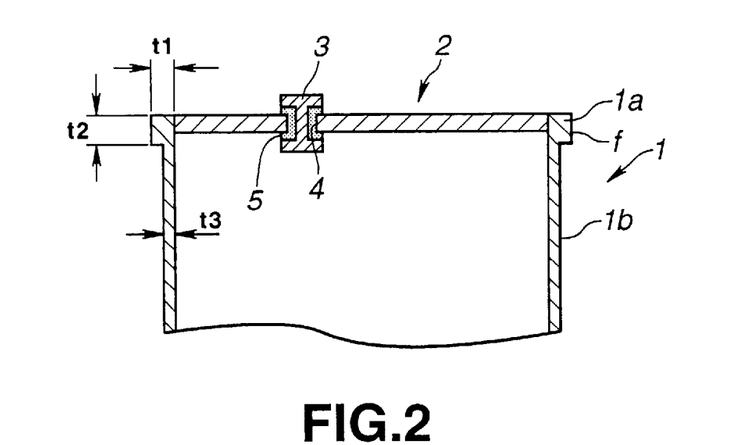
FIG. 2 is a schematic cross sectional view showing an embodiment of a rectangular and sealed battery according to the present invention.

FIG. 2 shows a first embodiment of the rectangular and sealed battery according to the present invention. The basic structure of the rectangular and sealed battery according to this embodiment is the same as that of a usual rectangular and sealed battery. A power generation element (a laminate of a positive electrode and a negative electrode formed through a separator (not shown)) is accommodated in an outer can 1. An opening of the outer can 1 is closed by a plate-like cover 2.

The rectangular and sealed battery having the above-mentioned structure is characterized in that the thickness of a body 1b of the outer can 1 is smaller than the thickness of an end or rim portion 1a of the opening.

Specifically, as shown in FIG. 2, a flange f is formed around the end 1a of the opening. As an alternative to this, as shown in FIG. 3, a tapered portion T is formed around the end 1a of the opening, the thickness of the tapered portion T being reduced toward the body 1b.

The size of the flange f, the size of the tapered portion T and the thickness of the body 1b may arbitrarily be determined to be adaptable to the material and the strength of each of the outer can 1 and the cover 2, conditions under which the outer can 1 and the cover 2 are seam-welded to each other and so forth.

In an example case of a rectangular and sealed battery incorporating a steel outer can having a thickness of 0.4 mm and a size 6 mm (t)×30 mm (w)×48 mm, (h), the overall weight of the rectangular and sealed battery is about 25 g (including about 11 g which is the weight of the can). When a flange having a size (t1=0.4 mm and t2=0.6 mm) as shown in FIG. 2 is provided and the thickness t3 of the body 1b is 0.2 mm, the overall weight of the battery can be reduced to about 20 g.

Figure 3:
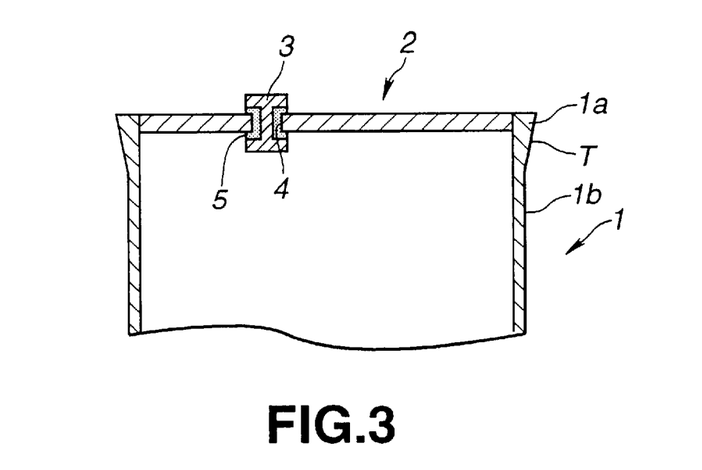
FIG. 3 is a schematic cross sectional view showing another embodiment of the rectangular and sealed battery according to the present invention.
Figure 4:
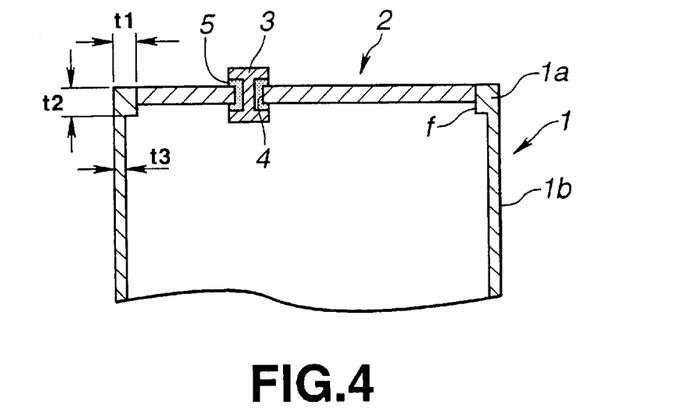
FIG. 4 is a schematic cross sectional view sowing another embodiment of the rectangular and sealed battery according to the present invention.
Figure 5:
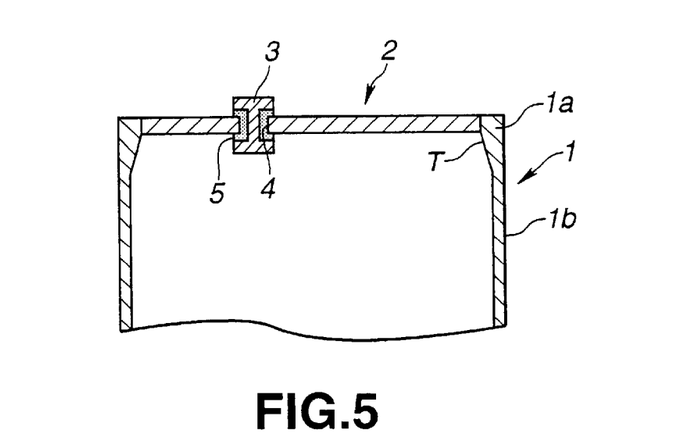
FIG. 5 is a schematic cross sectional view showing another embodiment of the rectangular and sealed battery according to the present invention.

FIGS. 2 and 3 show the flange f and the tapered portion T formed to project outwardly over the rectangular and sealed battery. As shown in FIG. 4, a flange f may be formed around the inner end of the end 1a of the opening of the outer can 1. As shown in FIG. 5, the tapered portion T may be provided around the inner end of the end 1a of the opening of the outer can 1, the tapered portion T being tapered toward the body 1b of the outer can 1. Since the volume of the battery is enlarged in each of the foregoing cases, the battery capacity is enlarged. When the rectangular and sealed battery incorporating an outer can having a thickness of 0.4 mm and a size 6 mm (t)×30 mm (w)×48 mm (h) is provided with the flange (t1=0.4 mm and t2=0.6 mm) structured as shown in FIG. 4 and the thickness t2 of the body 1*b* is made to be 0.2 mm, the battery capacity is enlarged by about 7%.

In each of the embodiments shown in FIGS. 2, 3, 4 and 5, the cover 2 is, similarly to the conventional cover, manufactured by stamping a steel plate, and by machining, such as by drawing or casting, to have a size substantially the same as or slightly smaller than that of the opening of the outer can 1. Also a terminal hole 4, through which a counter terminal 3 is inserted, is formed in the cover 2. The terminal 3 is, through a gasket 5, inserted into a terminal hole 4 of the cover 2, and then the leading end of the terminal 3 is crimped. Thus, the terminal 3 is integrally secured to the cover 2. As a result, either of electrodes of the battery is formed. When the foregoing electrode is electrically connected to a positive electrode of the power generation elements accommodated in the outer can 1, the foregoing electrode serves as a positive-electrode terminal. The structure for joining the terminal 3 is not limited to the above-mentioned structure. Another structure may be employed if the structure is able to maintain electrical insulation with respect to the cover 2 and hermeticity of the inside portion of the battery.

The foregoing rectangular and sealed battery can be manufactured by introducing the power generation element into the outer can 1, by joining the cover 2 to the opening of the outer can 1 and by seam-welding the opening and the cover 2 to each other by a laser welding method so as to be secured to each other.

Another embodiment of the rectangular and sealed battery according to the present invention will now be described.

Figure 6:
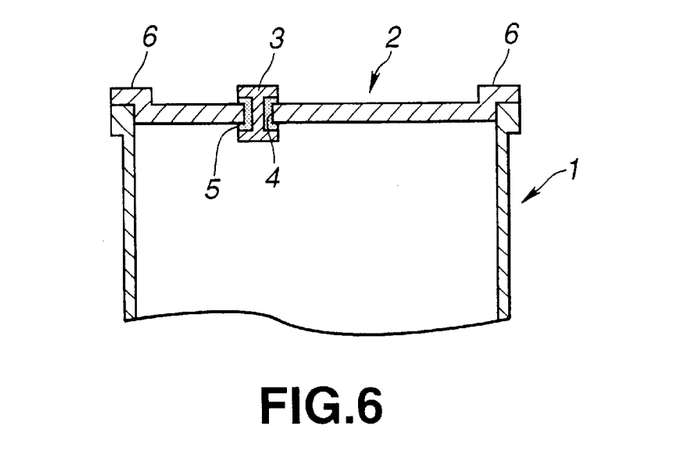
FIG. 6 is a schematic cross sectional view showing another embodiment of the rectangular and sealed battery according to the present invention.

The rectangular and sealed battery according to this embodiment incorporates a cover of the foregoing rectangular and sealed battery which is modified. That is, the rectangular and sealed battery according to this embodiment incorporates a cover 2 structured as shown in FIG. 6 and employed in place of the cover 2 shown in FIG. 2. The cover 2 according to this embodiment has a flange 6 formed around the outer end periphery thereof by an operation for bending the outer end periphery.

Figure 7:
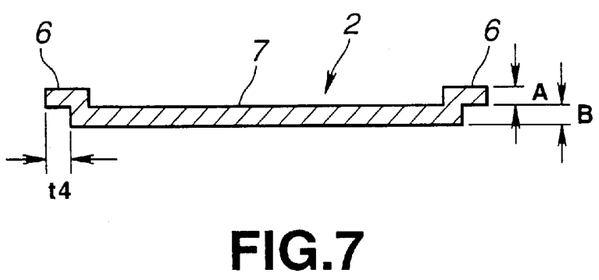
FIG. 7 is a schematic cross sectional view showing an example of the shape of a cover of the rectangular and sealed battery according to the present invention.
Figure 8:
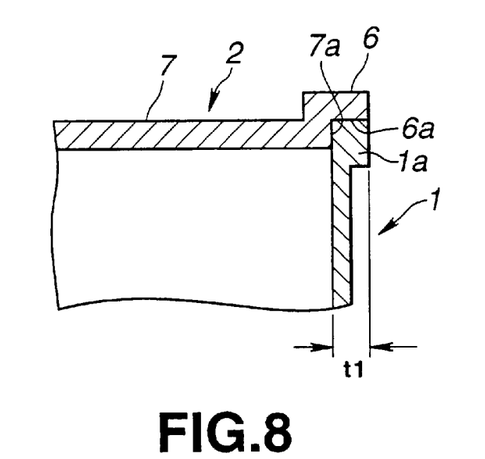
FIG. 8 is a schematic and enlarged cross sectional view showing an essential portion of a welded portion between the cover and an outer can.

The flange 6 of the cover 2 shown in FIG. 6 forms a stepped portion with respect to a body 7 of the cover 2, as shown in FIG. 7, so as to upwards project (outwards over the battery) when it is viewed in the drawing. Therefore, the body 7 of the cover 2 is formed into a projection facing the inside portion of the battery (when the battery is viewed, the body 7 is in the form of a recess). As shown in FIG. 8, the end 1*a* of the opening of the outer can 1 is engaged to the projection (the body 7) to be in contact with a surface 7*a* of the body 7. Moreover, the leading end of the end 1*a* of the opening is made contact with the flange 6.

Since the cover 2 has the above-mentioned structure, the flexural rigidity can significantly be increased. Thus, deformation occurring when the cover 2 is handled before it is joined to the outer can 1 can be prevented. Moreover, a state of the joined outer can 1 can be stabilized.

As for the dimensions of the cover 2, it is preferable that a projection quantity t4 of the flange 6 shown in FIG. 7 is substantially the same as the thickness t1 of a metal plate which constitutes the end 1*a* of the opening of the outer can 1 shown in FIG. 8. It leads to a fact that the outer surface of the seam-welded portion is made to be free from any stepped portion.

It is preferable that stepped portion B between the flange 6 and the body 7 is larger (A≦B) than thickness A of the metal plate constituting the cover 2. If the stepped portion B is too small, satisfactory flexural rigidity cannot be realized.

Thus, there is apprehension that a state of joining of the outer can 1 becomes intable. The size of the stepped portion B is not limited. If the stepped portion B is too large, a shape that the cover 2 is recessed greatly is formed when the battery is viewed. The internal space is reduced undesirably, causing a disadvantage in terms of obtaining a large battery capacity to be realized.

Figure 9:
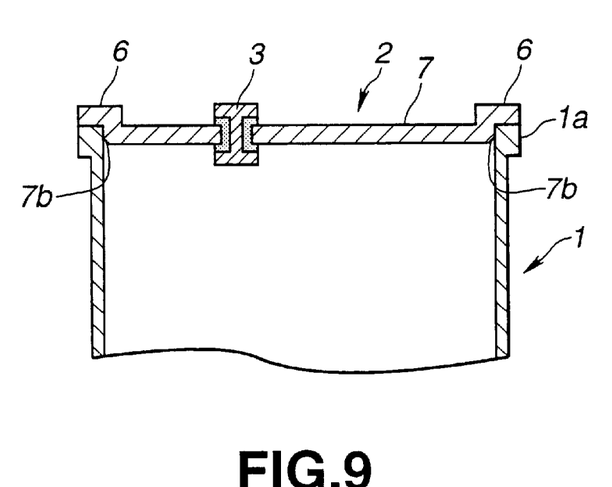
FIG. 9 is a schematic cross sectional view showing an essential portion of another embodiment of the rectangular and sealed battery according to the present invention.

It is preferable that the edges of the outer end of the leading end of the projection of the body 7 of the cover 2 is chamfered to form an inclined surface 7*b*, as shown in FIG. 9. The inclined surface 7*b* serves as a guide for inserting the end 1*a* of the opening of the outer can 1 into the cover 2. Therefore, defects in insertion occurring in an assembling process can considerably be decreased.

The inclined surface 7*b* can easily be formed at a low cost by a usual drawing process or a forging process.

As for the dimensional relationship between the cover 2 and the outer can 1, separation of the cover 2 easily occurs before the welding (seal welding) process is performed for the purpose of sealing the joint portion if the cover 2 and the outer can 1 are joined to each other loosely. In this case, there is apprehension that the productivity deteriorates. Moreover, the relative position between the cover 2 and the outer can 1 easily deviates. Therefore, a stepped portion is formed in the portion which must be seam-welded, causing a defect in welding to easily take place.

If the cover 2 and the outer can 1 are joined to each other too tightly, insertion of the cover 2 cannot easily be performed in the insertion process. Also in the foregoing case, the productivity excessively deteriorates.

Figure 10:
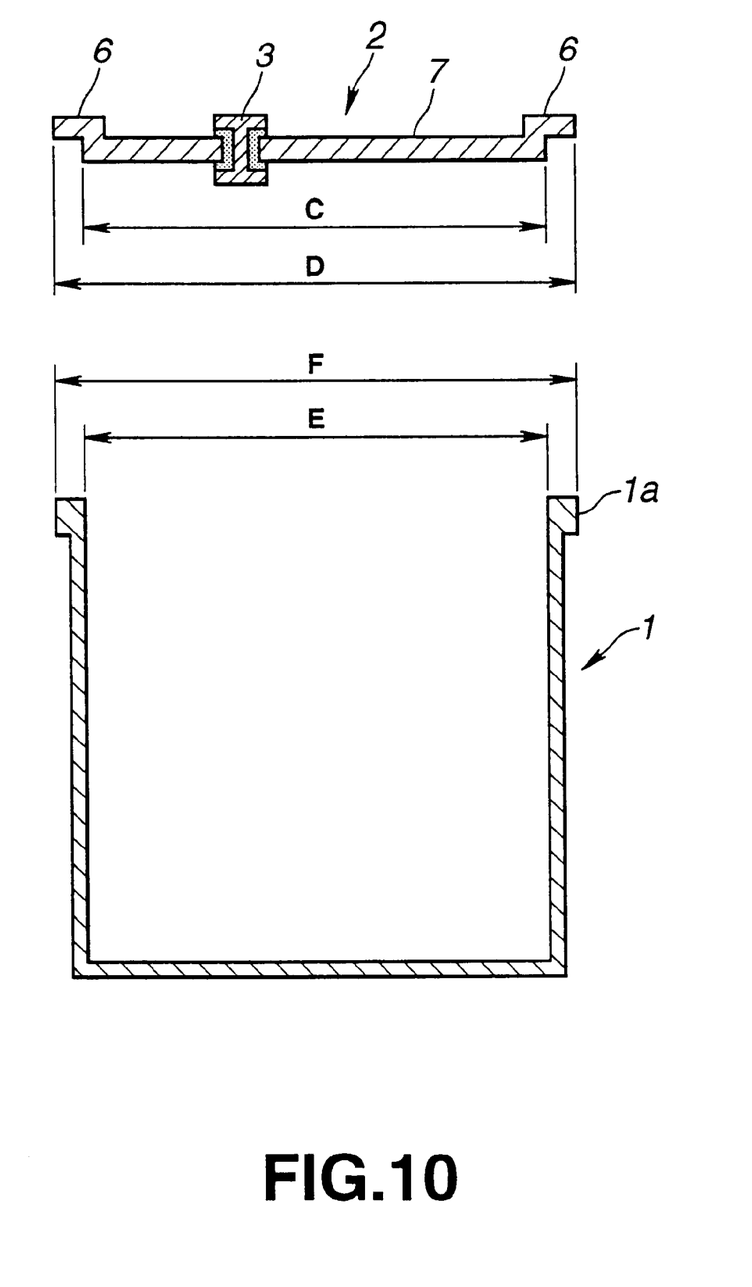
FIG. 10 is a schematic cross sectional view showing the relationship between the dimensions of the cover and those of the outer can.

From the foregoing viewpoints, it is preferable that the dimensions shown in FIG. 10 are determined appropriately. The dimensions include dimension C of the inner projection (the body 7) of the cover 2, outer size (the outer size of the flange 6) D of the cover 2, inner size E of the outer can 1 and outer size F of the outer can 1.

It is preferable that a gap between the inner projection of the cover 2 and the end 1*a* of the opening of the outer can 1, that is, the difference (E-C) between the dimension E and the dimension C, is 0.1 mm to −0.05 mm.

It is preferable that the size of the added stepped portions formed between the cover 2 and the outer can 1, that is, the difference (D-F) between the dimension D and the dimension F is 0.1 mm to −0.1 mm. If the dimensional difference (D-F) is too large, a stepped portion is formed in the joint portion between the cover 2 and the outer can 1. In this case, a pinhole or a small crack is easily formed in the seam-welded portion.

The above-mentioned rectangular and sealed battery can be manufactured by introducing the power generation element into the outer can 1, by joining the cover 2 to the opening of the outer can 1 and by seam-welding the two elements by the laser welding method so as to be secured to each other.

The body 7 of the cover 2 is inserted into the opening of the outer can 1 so as to be joined to the outer can 1. As shown in FIG. 8, the inner surface of the outer can 1 is brought into contact with the surface 7*a* of the body 7, as shown in FIG. 8. Moreover, the flange 6 of the cover 2 is placed on the end of the opening of the outer can 1. Thus, the cover 2 and the outer can 1 are joined to each other.

At this time, the surface of the leading end of the flange 6 of the cover 2 and the outer surface of the outer can 1 are substantially flush with each other.

The sealing process is performed by welding the joint portion between the flange 6 of the cover 2 and the outer can 1 from a side portion by using a laser welding machine.

The above-mentioned rectangular and sealed battery according to the present invention can be applied to a variety of primary and secondary batteries. In particular, the foregoing rectangular and sealed battery can be employed as a lithium-ion secondary battery.

The foregoing rectangular and sealed battery may contain a material for the negative electrode thereof, the material being obtained by preparing, for example, a carbonaceous material at a predetermined temperature and in a predetermined environment.

Preferred carbon is exemplified by petroleum pitch, binder pitch, polymer resins and green coke. Also a material obtained by preparing a mixture by using any one of the following material may be employed: graphite, pyrocarbon, code (petroleum coke, pitch coke, needle coke or the like), carbon black (acetylene black or the like), vitreous carbon, burned organic polymers (materials obtained by burning an organic material at an appropriate temperature not lower than 500° C. in an inert gas flow or in a vacuum), pitch or resins containing carbon fibers and the foregoing resin component and exhibiting excellent sintering easiness, for example, a furan resin, divinyl benzene, polyvinylidene fluoride or polyvinylidene chloride.

As an alternative to this, a negative electrode may be employed which is made of metal lithium, lithium alloy or a material prepared by doping lithium into polymer.

On the other hand, the positive electrode contains an active material containing $Li_xMO_2$ (where M is one or more types of transition metal materials, preferably at least one material selected from Co, Ni and Fe and $0.05 \leq x \leq 1.10$). The foregoing active material is exemplified by a composite oxide expressed by $LiCoO_2$, $LiNiO_2$, $LiNi_y Co_{(1-y)}O_2$ (where $0.05 \leq x \leq 1.10$ and $0 < y < 1$). Also $LiMn_2O_4$ may be employed.

The foregoing composite oxide can be obtained by mixing carbon salt of, for example, lithium, cobalt, nickel or the like, in accordance with the composition, followed by sintering the mixed material in an environment in which oxygen is present at a temperature satisfying a range from 400° C. to 1000° C. The starting material is not limited to the carbon salt. Also hydroxide or oxide may be employed to perform synthesis.

When metal lithium or lithium alloy is employed, a compound from which lithium cannot be dedoped in an initial charging process may be employed, which is exemplified by oxides, such as manganese dioxide or titanium oxide; sulfide, such as titanium sulfide; and polymer, such as polyaniline.

As for the electrolyte, any one of known electrolyte of a type manufactured by dissolving electrolyte in organic solvent may be employed. Therefore, the organic solvent is exemplified by ester, such as propylene carbonate, ethylene carbonate or γ-butyl lactone; diethyl ether; tetrahydrofuran; substitution tetrahydrofuran; dioxolane; pyron; their derivatives; ether, such as dimethoxyethane or diethoxyethane; 3-substitution-2-oxazolidinon, such as 3-methyl-2-oxazolidinon; sulfolane; methyl sulfolane; acetinitrile; and propionitrile. Any one of the foregoing materials is employed or their mixture is employed. The electrolyte may be lithium perchlorate, lithium borofluoride, lithium phosphofluoride, lithium chloride aluminate, lithium halide and lithium trifluoromethane sulfonate.

The rectangular and sealed battery according to the present invention is structured such that the thickness of the body of the outer can is reduced while the thickness of the end of the opening of the outer can which is seam-welded with the cover is not reduced as compared with that of the conventional battery. Therefore, the weight reduction of the rectangular and sealed battery can be realized such that deterioration in the reliability of seam welding is prevented. When the inner size of the body of the outer can is enlarged such that the outer size of the body of the outer can is maintained, the inner space can be enlarged. Therefore, the active material of the electrode can be enclosed in a larger quantity as compared with that permitted for the conventional battery. As a result, the battery capacity can be enlarged.

The rectangular and sealed battery according to the projection has the flange in the form of a stepped portion provided for the outer end of the cover to join the end of the opening of the outer can to the formed projection of the cover. Thus, the end of the opening of the outer can is abutted against the flange, causing the position to be limited. Moreover, the foregoing end is made contact with the outer surface of the projection. As a result, the outer can and the cover can stably and easily be joined to each other. Therefore, a reliable seam welding operation can be performed because pinholes and small cracks can be prevented.

Examples of the present invention will now be described.

EXAMPLE 1

Initially, the negative electrode was manufactured as follows.

As a starting material, pitch coke manufactured by Mitsubishi Chemical was burnt at a temperature of 2800° C. in an inert gas flow so that a carbonaceous material having characteristics similar to those of graphite was obtained. The foregoing material was subjected to X-ray diffraction measurement process. As a result, the spacing of plane-002 was 3.35 angstroms and the true specific gravity was 2.24 g/cm³. The foregoing carbonaceous material was pulverized so that powder of the carbonaceous material having an average particle size of 10 μm was obtained.

Thus-obtained powder of the carbonaceous material was used as a carrier for an active material of the negative electrode. Ninety parts of the carrier and ten parts of polyvinylidene fluoride (PVdF) were mixed with each other so that a mix for the negative electrode was prepared. The mix for the negative electrode was dispersed in N-methyl pyrolidone which was solvent so that slurry of the mix (in the form of paste) for the negative electrode was prepared.

Obtained slurry of the mix for the negative electrode was applied to the two sides of elongated copper foil having a thickness of 15 μm. Then, slurry was dried, and then a compression molding process using a roller pressing machine was performed. Thus, an elongated negative electrode 1 was manufactured. Note that the elongated negative electrode had the structure that the thicknesses of the mix applied to the two sides of the elongated negative electrode were the same thickness of 70 μm, the width was 40.5 mm and the length of the portion applied with the active material was 345 mm. The volume density of the active material for the electrode was 1.5 g/ml.

Then, the positive electrode was manufactured as follows.

An active material ($LiCoO_2$) for the positive electrode was prepared as follows: lithium carbonate and cobalt carbonate were mixed with each other such that Li—Co (molar ratio)=1, and then the mixed material was burnt in air at 900° C. for 5 hours. The prepared material was subjected to X-ray diffraction measurement. As a result, the material was in close agreement with $LiCoO_2$ of JCPDS card. Then, an automatic mortar was used to pulverize the material so that LiCoO$_2$ was obtained. Then, obtained LiCoO$_2$ was used so that 94.5 wt % of LiCoO$_2$, 2.0 wt % of graphite serving as a conductive material, 0.5 wt % of ketchen black and 3 wt % of polyvinylidene fluoride were mixed with one another so that mix for the positive electrode was prepared. The mix was dispersed in N-methyl-2 pyrolidone so as to be slurried. Then, obtained slurry was applied to the two sides of elongated aluminum foil having a thickness of 20 μm, and then the slurry was dried. A roller pressing machine was operated so that a compression molding was performed. Thus, the positive electrode was manufactured. Note that the elongated positive electrode had the structure that the thicknesses of the mix applied to the two sides of the elongated negative electrode were the same thickness of 60 μm, the width was 38.5 mm and the length of the portion applied with the active material was 325 mm. The volume density of the active material for the electrode was 3.3 g/ml.

The elongated positive and negative electrodes and a separator having a thickness of 30 μm and a width of 43.1 mm and made of fine porous polyethylene film were sequentially laminated. Then, the laminate was, many times, wound around a winding core formed into a rhombic core. An end of a negative electrode lead made of nickel to collect electricity of the positive electrode was secured to the electrode by melting, while another end was welded to the battery capacity. To collect electricity of the positive electrode, an end of a positive electrode lead made of aluminum was joined to the positive electrode. Another end of the lead was laser-welded to the cover of the battery.

The cover had a thickness of 0.45 mm molded to have an outer end provided with a flange having a stepped portion. The can had an upper opening, the thickness of which was 0.35 mm. A region of 3.5 mm was provided which had the thickness of 0.35 mm. The thickness of the body portion was 0.2 mm. The cover was joined to the can, and then the cover and the can were sealed by laser welding (refer to FIG. 6). As a result, a rectangular battery having a thickness of 6 mm, a height of 48 mm and a width of 30 mm was manufactured.

Then, electrolyte containing mixed solvent of 50 VOL % ethylene carbonate and 50 VOL % diethylcarbonate in which 1.5 mol/l of LiPF$_6$ was dissolved was introduced into the battery can. Then, steel balls were electrically welded to seal the opening.

The weight of the battery was 20.5 g.

COMPARATIVE EXAMPLE 1

Similarly to Example 1, the conventional pressing operation was performed such that the thickness of the upper opening of the can was not changed. A can having a uniform thickness of 0.2 mm was employed, and a laser welding operation was performed. Thus, a battery was manufactured.

The weight of the battery was 20.2 g.

COMPARATIVE EXAMPLE 2

A process similar to that according to Example 1 was performed so that a battery was manufactured. However, the dimensions of the cover were changed. The joint was performed on the inside portion of the can, and the laser welding operation was performed from an upper portion in place of the side portion. Thus a battery was manufactured.

The weight of the battery was 20.5 g.

COMPARATIVE EXAMPLE 3

The can according to Example 1 was changed. A can having a uniform thickness of 0.4 mm was used, and a laser welding operation was performed from the side surface. Thus, a battery was manufactured. The weight of the battery was 25.0 g.

Defects in sealing were detected in 1000 batteries of the foregoing type.

The batteries were charged with an electric current of 300 mA upto 4.2 V, and then discharged with the same electronic current to 3.0 V. Thus, the capacities were measured.

Moreover, counted defects of the laser-welded portions of the manufactured batteries were shown in Table 1.

TABLE 1

|  | Discharged Capacity | Defects in Laser-Welded Portion (Defects of Pinholes) | Weight g |
| --- | --- | --- | --- |
| Example 1 | 620 | 0/1000 | 20.5 |
| Comparative Example 1 | 620 | 55/1000 | 20.2 |
| Comparative Example 2 | 620 | 17/1000 | 20.5 |
| Comparative Example 3 | 580 | 0/1000 | 25 |

As can be understood also from Table 1, the batteries according to Example 1 had a satisfactory charge/discharge capacity, weight and a ratio of defects of manufactured batteries.

EXAMPLES 2 TO 7

The thicknesses of the upper and body portions of the can were changed so that batteries according to Examples 2 to 7 are manufactured.

Results were shown in Table 2.

Although modifications and changes may be suggested by those skilled in the art, it is the intention of the inventors to embody within the patent warranted hereon all changes and modifications as reasonably and properly come within the scope of their contribution to the art.

TABLE 2

|  | Thickness of Upper Portion | Thickness of Body | Discharge Capacity | Defects in Laser-Welded Portion (Defects of Pinholes) | Weight g |
| --- | --- | --- | --- | --- | --- |
| Example 2 | 0.25 | 0.2 | 620 | 36/1000 | 20.3 |
| Example 3 | 0.3 | 0.2 | 620 | 0/1000 | 20.5 |
| Example 4 | 0.4 | 0.2 | 620 | 0/1000 | 20.7 |
| Example 5 | 0.5 | 0.2 | 620 | 0/1000 | 21.0 |
| Example 6 | 0.30 | 0.15 | 640 | 3/1000 | 19.6 |
| Example 7 | 0.30 | 0.12 | 650 | 126/1000 | 19.5 |

In view of the foregoing, the thickness of the upper portion must be 0.3 mm to 0.5 mm. From a viewpoint of the weight of the battery, it is preferable that the thickness is 0.3 mm to 0.4 mm.

The thickness of the body must be 0.15 mm or greater. From viewpoints of a defect ratio and the weight, it is preferable that the thickness is 0.2 mm.

What is claimed is:

1. A battery, comprising:
   (a) an outer can, the can being rectangular, the outer can having a can wall having a can wall top end, the can wall having a can wall outer surface and a can wall inner surface, the can wall outer surface and can wall inner surface being parallel to each other;

(b) a can flange disposed at the can wall top end, the can flange having a can flange outer surface and a can flange inner surface, the can flange outer surface and inner surface being parallel to each other; the can flange further including a can flange top surface perpendicular to the can flange inner surface;

(c) a cover having a cover top surface and a cover bottom surface;

(d) the cover further including a cover flange, the cover flange having a cover flange outer surface, a cover flange inner surface, a cover flange bottom surface, a cover flange top surface, a cover flange intermediate surface disposed between the cover flange inner and outer surfaces;

(e) wherein the cover flange top surface is parallel to the cover flange bottom surface; and wherein the cover flange top surface is parallel to the cover bottom surface;

(f) wherein the cover flange inner surface is parallel to the cover flange outer surface;

(g) wherein the can flange inner surface is parallel to the cover flange intermediate surface;

(h) wherein the outer can is adapted to accommodate a power generation element, formed by winding a laminate of a positive electrode and a negative electrode separated by a separator:
wherein the outer can is adapted to accommodate an electrolyte;
wherein the electrolyte is dissolved in an organic solvent;
wherein the positive electrode comprises $Li_xMO_2$ as an active material such that M comprises a transition metal;
X ranges from 0.05 to 1.10;
and wherein the negative electrode comprises carbonaceous material as an active material;

(i) the plane of the cover top surface is in the same plane as the can flange top surface; and (j) a junction between the cover bottom surface and the cover flange intermediate surface is chamfered.

2. The battery of claim 1, wherein the plane of the cover top surface is perpendicular to the plane of the can flange inner surface.

3. The battery of claim 1, wherein the plane of the cover flange bottom surface is perpendicular to the plane of the can flange inner surface.

4. The battery of claim 1, wherein the plane of the cover top surface is between the plane of the cover flange top surface and the plane of a can flange bottom surface.

5. The battery of claim 1, wherein the plane of the cover bottom surface is between the plane of the can wall flange top surface and the plane of a can flange bottom surface.

6. The battery of claim 1, wherein the plane of the cover top surface is perpendicular to the plane of the can flange inner surface; wherein the plane of the cover flange bottom surface is perpendicular to the plane of the can flange inner surface; and wherein the plane of the cover top surface is between the plane of the cover flange top surface and the plane of a can flange bottom surface.

7. The battery of claim 1, wherein the active material of the positive electrode is formed on both sides of a charge collector of the positive electrode and the active material of the negative electrode is formed on both sides of a charge collector of the negative electrode.

8. A battery, comprising:

(a) an outer can, the can being rectangular, the outer can having a can wall having a can wall top end, the can wall having a can wall outer surface and a can wall inner surface, the can wall outer surface and can wall inner surface being parallel to each other;

(b) a can flange disposed at the can wall top end, the can flange having a can flange outer surface and a can flange inner surface, the can flange outer surface and inner surface being parallel to each other; the can flange further including a can flange top surface perpendicular to the can flange inner surface;

(c) a cover having a cover top surface and a cover bottom surface;

(d) the cover further including a cover flange, the cover flange having a cover flange outer surface, a cover flange inner surface, a cover flange bottom surface, a cover flange top surface, a cover flange intermediate surface disposed between the cover flange inner and outer surfaces;

(e) wherein the cover flange top surface is parallel to the cover flange bottom surface; and wherein the cover flange top surface is parallel to the cover bottom surface;

(f) wherein the cover flange inner surface is parallel to the cover flange outer surface;

(g) wherein the can flange inner surface is parallel to the cover flange intermediate surface;

(h) the plane of the cover top surface is in the same plane as the can flange top surface;

(i) wherein the plane of the cover top surface is perpendicular to the plane of the can flange inner surface; wherein the plane of the cover flange bottom surface is perpendicular to the plane of the can flange inner surface; and wherein the plane of the cover top surface is between the plane of the cover flange top surface and the plane of a can flange bottom surface; and (j) wherein the outer can is adapted to accommodate a power generation element, formed by winding a laminate of a positive electrode and a negative electrode separated by a separator;
wherein the outer can is adapted to accommodate an electrolyte;
wherein the electrolyte is dissolved in an organic solvent;
wherein the positive electrode comprises $Li_xMO_2$ as an active material such that M comprises a transition metal;
X ranges from 0.05 to 1.10; and
wherein the negative electrode comprises carbonaceous material as an active material; and (k) a junction between the cover bottom surface and the cover flange intermediate surface is chamfered.

9. The battery of claim 8, wherein the active material of the positive electrode is formed on both sides of a charge collector of the positive electrode and the active material of the negative electrode is formed on both sides of a charge collector of the negative electrode.

10. The battery of claim 4, wherein the carbonaceous material further comprises at least one of a petroleum pitch, binder pitch, polymer resins, and green coke.

11. The battery of claim 8, wherein the positive electrode comprises at least one of a $LiCoO_2$, $LiNiO_2$, $LiMn_2O_4$, and $LiNi_yCO_{(l-y)}O_2$, wherein $0.05 \leq x \leq 1.10$ and $0 < y < 1$.

12. A battery, comprising:

(a) an outer can, the can being rectangular, the outer can having a can wall having a can wall top end, the can wall having a can wall outer surface and a can wall inner surface, the can wall outer surface and can wall inner surface being parallel to each other;

(b) a can flange disposed at the can wall top end, the can flange having a can flange outer surface and a can flange inner surface, the can flange outer surface and inner surface being parallel to each other; the can flange further including a can flange top surface perpendicular to the can flange inner surface;

(c) a cover having a cover top surface and a cover bottom surface;

(d) the cover further including a cover flange, the cover flange having a cover flange outer surface, a cover flange inner surface, a cover flange bottom surface, a cover flange top surface, a cover flange intermediate surface disposed between the cover flange inner and outer surfaces;

(e) wherein the cover flange top surface is parallel to the cover flange bottom surface; and wherein the cover flange top surface is parallel to the cover bottom surface;

(f) wherein the cover flange inner surface is parallel to the cover flange outer surface;

(g) wherein the can flange inner surface is parallel to the cover flange intermediate surface;

(h) the plane of the cover top surface is in the same plane as the can flange top surface;

(i) wherein the plane of the cover top surface is perpendicular to the plane of the can flange inner surface;

(j) wherein the plane of the cover flange bottom surface is perpendicular to the plane of the can flange inner surface;

(k) wherein the plane of the cover top surface is between the plane of the cover flange top surface and the plane of a can flange bottom surface;

(l) wherein the plane of the cover bottom surface is between the plane of the can flange top surface and the plane of a can flange bottom surface;

(m) wherein the cover bottom surface has a cover bottom width slightly less than an inner can width, the inner can width being defined as the width between opposing can inner surface walls;

(o) wherein the outer can is adapted to accommodate a power generation element, formed by winding a laminate of a positive electrode and a negative electrode separated by a separator; wherein the positive electrode comprises $Li_xMO2$ as an active material such that M comprises a transition metal and X ranges from 0.05 to 1.10, and wherein the negative electrode comprises carbonaceous material as an active material; and (p) wherein the active material of the positive electrode is formed on both sides of a charge collector of the positive electrode and the active material of the negative electrode is formed on both sides of a charge collector of the negative electrode;

(q) a junction between the cover bottom surface and the cover flange intermediate surface is chamfered; and (r) the cover further including a single through-hole connecting the cover bottom surface to the cover top surface, and a counter terminal extending into the single through-hole.

* * * * *